(12) United States Patent
Armstrong et al.

(10) Patent No.: US 7,445,658 B2
(45) Date of Patent: *Nov. 4, 2008

(54) TITANIUM AND TITANIUM ALLOYS

(75) Inventors: Donn Reynolds Armstrong, Waukesha, WI (US); Stanley R. Borys, Elmhurst, IL (US); Richard P. Anderson, Clarendon Hills, IL (US)

(73) Assignee: UChicago Argonne, LLC, Chicago, IL (US)

( * ) Notice: Subject to any disclaimer, the term of this patent is extended or adjusted under 35 U.S.C. 154(b) by 1197 days.

This patent is subject to a terminal disclaimer.

(21) Appl. No.: 10/125,942

(22) Filed: Apr. 19, 2002

(65) Prior Publication Data

US 2002/0148327 A1    Oct. 17, 2002

Related U.S. Application Data

(63) Continuation of application No. 09/264,577, filed on Mar. 8, 1999, now Pat. No. 6,409,797, which is a continuation-in-part of application No. 08/782,816, filed on Jan. 13, 1997, now Pat. No. 5,958,106, which is a continuation of application No. 08/691,423, which is a continuation-in-part of application No. 08/691,423, filed on Aug. 2, 1996, now Pat. No. 5,779,761.

(51) Int. Cl.
    *C22C 14/00*    (2006.01)
(52) U.S. Cl. .................. 75/255; 148/421; 420/417
(58) Field of Classification Search .............. 75/255; 148/421; 420/417
    See application file for complete search history.

(56) References Cited

U.S. PATENT DOCUMENTS 2,205,854 A    6/1940 Kroll
2,846,303 A    8/1958 Keller et al.
2,846,304 A    8/1958 Keller et al.
2,882,143 A    4/1959 Schmidt et al.
2,890,112 A    6/1959 Winter, Jr.

(Continued)

FOREIGN PATENT DOCUMENTS

AU    4301785    11/1985

(Continued)

OTHER PUBLICATIONS

Metallurgical Transactions B, vol. 18B, No. 1, Process Metallurgy, Sep. 1987, Attempted Preparation of Ti-6-4 Alloy Powders from $TiCl_4$, Al, $VCl_4$, and Na, pp. 511-517.

(Continued)

*Primary Examiner*—George Wyszomierski
(74) *Attorney, Agent, or Firm*—Olson & Cepuritis, Ltd.; Harry M. Levy

(57) ABSTRACT

A method of producing a non-metal element or a metal or an alloy thereof from a halide or mixtures thereof. The halide or mixtures thereof are contacted with a stream of liquid alkali metal or alkaline earth metal or mixtures thereof in sufficient quantity to convert the halide to the non-metal or the metal or alloy and to maintain the temperature of the reactants at a temperature lower than the lesser of the boiling point of the alkali or alkaline earth metal at atmospheric pressure or the sintering temperature of the produced non-metal or metal or alloy. A continuous method is disclosed, particularly applicable to titanium.

44 Claims, 8 Drawing Sheets

U.S. PATENT DOCUMENTS

| | | |
|---|---|---|
| 2,941,867 A | 6/1960 | Maurer |
| 2,944,888 A | 7/1960 | Quin et al. |
| 3,058,820 A | 10/1962 | Whitehurst |
| 3,067,025 A | 12/1962 | Chisholm |
| 3,113,017 A | 12/1963 | Homme |
| 3,519,258 A | 7/1970 | Ishizuka |
| 3,535,109 A | 10/1970 | Ingersoll |
| 3,825,415 A | 7/1974 | Johnston et al. |
| 3,847,596 A | 11/1974 | Holland et al. |
| 3,966,460 A | 6/1976 | Spink |
| 4,009,007 A | 2/1977 | Fry |
| 4,017,302 A | 4/1977 | Bates et al. |
| 4,128,421 A | 12/1978 | Marsh et al. |
| 4,141,719 A | 2/1979 | Hakko |
| 4,149,876 A | 4/1979 | Rerat |
| 4,401,467 A | 8/1983 | Jordan |
| 4,423,004 A | 12/1983 | Ross |
| 4,445,931 A | 5/1984 | Worthington |
| 4,518,426 A | 5/1985 | Murphy |
| 4,521,281 A | 6/1985 | Kadija |
| 4,555,268 A | 11/1985 | Getz |
| 4,556,420 A | 12/1985 | Evans |
| RE32,260 E | 10/1986 | Fry |
| 4,687,632 A | 8/1987 | Hurd |
| 4,725,312 A | 2/1988 | Seon et al. |
| 4,830,665 A | 5/1989 | Winand |
| 4,877,445 A | 10/1989 | Okudaira et al. |
| 4,897,116 A | 1/1990 | Scheel |
| 4,902,341 A | 2/1990 | Okundaira et al. |
| 4,923,577 A | 5/1990 | McLaughlin et al. |
| 4,940,490 A | 7/1990 | Fife et al. |
| 4,985,069 A | 1/1991 | Traut |
| 5,028,491 A | 7/1991 | Huang et al. |
| 5,032,176 A | 7/1991 | Kametani et al. |
| 5,082,491 A | 1/1992 | Rerat |
| 5,149,497 A | 9/1992 | McKee et al. |
| 5,211,741 A | 5/1993 | Fife |
| 5,259,862 A | 11/1993 | White et al. |
| 5,338,379 A | 8/1994 | Kelly |
| 5,448,447 A | 9/1995 | Chang |
| 5,460,642 A | 10/1995 | Leland |
| 5,580,516 A | 12/1996 | Kumar |
| 5,954,856 A | 9/1999 | Pathare et al. |
| 5,986,877 A | 11/1999 | Pathare et al. |
| 6,027,585 A | 2/2000 | Patterson et al. |
| 6,040,975 A | 3/2000 | Mimura |
| 6,136,062 A | 10/2000 | Loffelholz et al. |
| 6,193,779 B1 | 2/2001 | Reichert et al. |
| 6,238,456 B1 | 5/2001 | Wolf et al. |

FOREIGN PATENT DOCUMENTS

| | | |
|---|---|---|
| EP | 0298698 | 1/1989 |
| EP | 0299791 | 1/1989 |
| JP | 9042518 | 4/1974 |
| JP | 1007808 | 1/1989 |
| JP | 5110803 | 4/1993 |
| NO | 90840 | 11/1957 |
| RU | 411962 | 1/1974 |

OTHER PUBLICATIONS

Ti Powder Metallurgy—A Perspective, C.A. Keito, B.A. Kosmal, D. Eylon and F.H. Fross, Materials Laboratory, Air Force Wright Aeronautical Labs., WPAFB, OH.

Titanium Powder Metallurgy—A Perspective C.A. Kelto, B.A. Kosmal, D. Eylon, F.H. Froes Materials Laboratory, Air Force Wright Aeronautical Labs WPAFB, OH Metcut-Materials Research Group WPAFB, OH.

TITANIUM AND TITANIUM ALLOYS

RELATED APPLICATIONS

This application is a continuation of Ser. No. 08/691,423 filed Aug. 2, 1996, now U.S. Pat. No. 5,779,761 and this application is a continuation of the file wrapper continuation application of our previously filed application Ser. No. 09/264,577 filed Mar. 8, 1999, now U.S. Pat. No. 6,409,797 issued Jul. 25, 2002, which was a continuation-in-part of Ser. No. 08/782,816, filed Jan. 13, 1997, now U.S. Pat. No. 5,958,106 issued Sep. 28, 1999, which was a continuation-in-part of Ser. No. 08/691,423, filed Aug. 2, 1996, now U.S. Pat. No. 5,779,761 issued Jul. 14, 1998. The disclosures of each of U.S. Pat. Nos. 5,779 761 and 5,958,106 are incorporated by reference.

BACKGROUND OF THE INVENTION

This invention relates to the production of elemental material from the halides thereof and has particular applicability to those metals and non-metals for which the reduction of the halide to the element is exothermic. Particular interest exists for titanium and the present invention will be described with particular reference to titanium, but is applicable to other metals and non-metals such as Al, As, Sb, Sn, Be, B, Ta, Ge, V, Nb, Mo, Ga, Ir, Os, U and Re, all of which produce significant heat upon reduction from the halide to the metal. For the purposes of this application, elemental materials include those metals and non-metals listed above or in Table 1.

At present titanium production is by reduction of titanium tetrachloride, which is made by chlorinating relatively high-grade titanium dioxide ore. Ores containing rutile can be physically concentrated to produce a satisfactory chlorination feed material; other sources of titanium dioxide, such as ilmenite, titaniferous iron ores and most other titanium source materials, require chemical beneficiation.

The reduction of titanium tetrachloride to metal has been attempted using a number of reducing agents including hydrogen, carbon, sodium, calcium, aluminum and magnesium. Both the magnesium and sodium reduction of titanium tetrachloride have proved to be commercial methods for producing titanium metal. However, current commercial methods use batch processing which requires significant material handling with resulting opportunities for contamination and gives quality variation from batch to batch. The greatest potential for decreasing production cost is the development of a continuous reduction process with attendant reduction in material handling. There is a strong demand for both the development of a process that enables continuous economical production of titanium metal and for the production of metal powder suitable for use without additional processing for application to powder metallurgy or for vacuum-arc melting to ingot form.

The Kroll process and the Hunter process are the two present day methods of producing titanium commercially. In the Kroll process, titanium tetrachloride is chemically reduced by magnesium at about 1000° C. The process is conducted in a batch fashion in a metal retort with an inert atmosphere, either helium or argon. Magnesium is charged into the vessel and heated to prepare a molten magnesium bath. Liquid titanium tetrachloride at room temperature is dispersed dropwise above the molten magnesium bath. The liquid titanium tetrachloride vaporizes in the gaseous zone above the molten magnesium bath. A reaction occurs on the molten magnesium surface to form titanium and magnesium chloride. The Hunter process is similar to the Kroll process, but uses sodium instead of magnesium to reduce the titanium tetrachloride to titanium metal and produces sodium chloride as a by product.

For both processes, the reaction is uncontrolled and sporadic and promotes the growth of dendritic titanium metal. The titanium fuses into a mass that encapsulates some of the molten magnesium (or sodium) chloride. This fused mass is called titanium sponge. After cooling of the metal retort, the solidified titanium sponge metal is broken up, crushed, purified and then dried in a stream of hot nitrogen. Metal ingots are made by compacting the sponge, welding pieces into an electrode and then melting it into an ingot in a high vacuum arc furnace. High purity ingots require multiple arc melting operations. Powder titanium is usually produced from the sponge through grinding, shot casting or centrifugal processes. A common technique is to first react the titanium with hydrogen to make brittle titanium hydride to facilitate the grinding process. After formation of the powder titanium hydride, the particles are dehydrogenated to produce a usable metal powder product. The processing of the titanium sponge into a usable form is difficult, labor intensive, and increases the product cost by a factor of two to three.

The processes discussed above have several intrinsic problems that contribute heavily to the high cost of titanium production. Batch process production is inherently capital and labor intensive. Titanium sponge requires substantial additional processing to produce titanium in a usable form; thereby increasing cost, increasing hazard to workers and exacerbating batch quality control difficulties. Neither process utilizes the large exothermic energy reaction, requiring substantial energy input for titanium production (approximately 6 kW-hr/kg product metal). In addition, the processes generate significant production wastes that are of environmental concern.

SUMMARY OF THE INVENTION

Accordingly, an object of the present invention is to provide a method and system for producing non-metals or metals or alloys thereof which is continuous having significant capital and operating costs advantages over existing batch technologies.

Another object of the present invention is to provide an improved batch or semi-batch process for producing non-metals or metals or alloys thereof where continuous operations are not warranted by the scale of the production.

Another object of the present invention is to provide a method and system for producing metals and non-metals from the exothermic reduction of the halide while preventing the metal or non-metal from sintering into large masses or onto the apparatus used to produce same.

Still another object of the invention is to provide a method and system for producing non-metal or metal from the halides thereof wherein the process and system recycles the reducing agent and removes the heat of reaction for use as process heat or for power generation, thereby substantially reducing the environmental impact of the process.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE INVENTION

The process of the invention may be practiced with the use of any alkali or alkaline earth metal depending upon the metal or non-metal to be reduced. In some cases, combinations of an alkali or alkaline earth metals may be used. Moreover, any halide or combinations of halides may be used with the present invention although in most circumstances chlorine, being the cheapest and most readily available, is preferred. Of the alkali or alkaline earth metals, by way of example, sodium will be chosen not for purposes of limitation but merely purposes of illustration, because it is cheapest and preferred, as has chlorine been chosen for the same purpose.

Regarding the non-metals or metals to be reduced, it is possible to reduce a single metal such as titanium or tantalum or zirconium, selected from the list set forth hereafter. It is also possible to make alloys of a predetermined composition by providing mixed metal halides at the beginning of the process in the required molecular ratio. By way of example, Table 1 sets forth heats of reaction per gram of liquid sodium for the reduction of a stoichiometric amount of a vapor of a non-metal or metal halides applicable to the inventive process.

TABLE 1

| FEEDSTOCK | HEAT kJ/g |
|---|---|
| $TiCl_4$ | 10 |
| $AlCL_3$ | 9 |
| $SnCl_2$ | 4 |
| $SbCl_3$ | 14 |
| $BeCl_2$ | 10 |
| $BeCl_3$ | 12 |
| $TaCl_5$ | 11 |
| $ZrCl_4$ | 9 |
| $VCl_4$ | 12 |
| $NbCl_5$ | 12 |
| $MoCl_4$ | 14 |
| $GaCl_3$ | 11 |
| $UF_6$ | 10 |
| $ReF_6$ | 17 |

The process will be illustrated, again for purposes of illustration and not for limitation, with a single metal titanium being produced from the tetrachloride.

Figure 1:
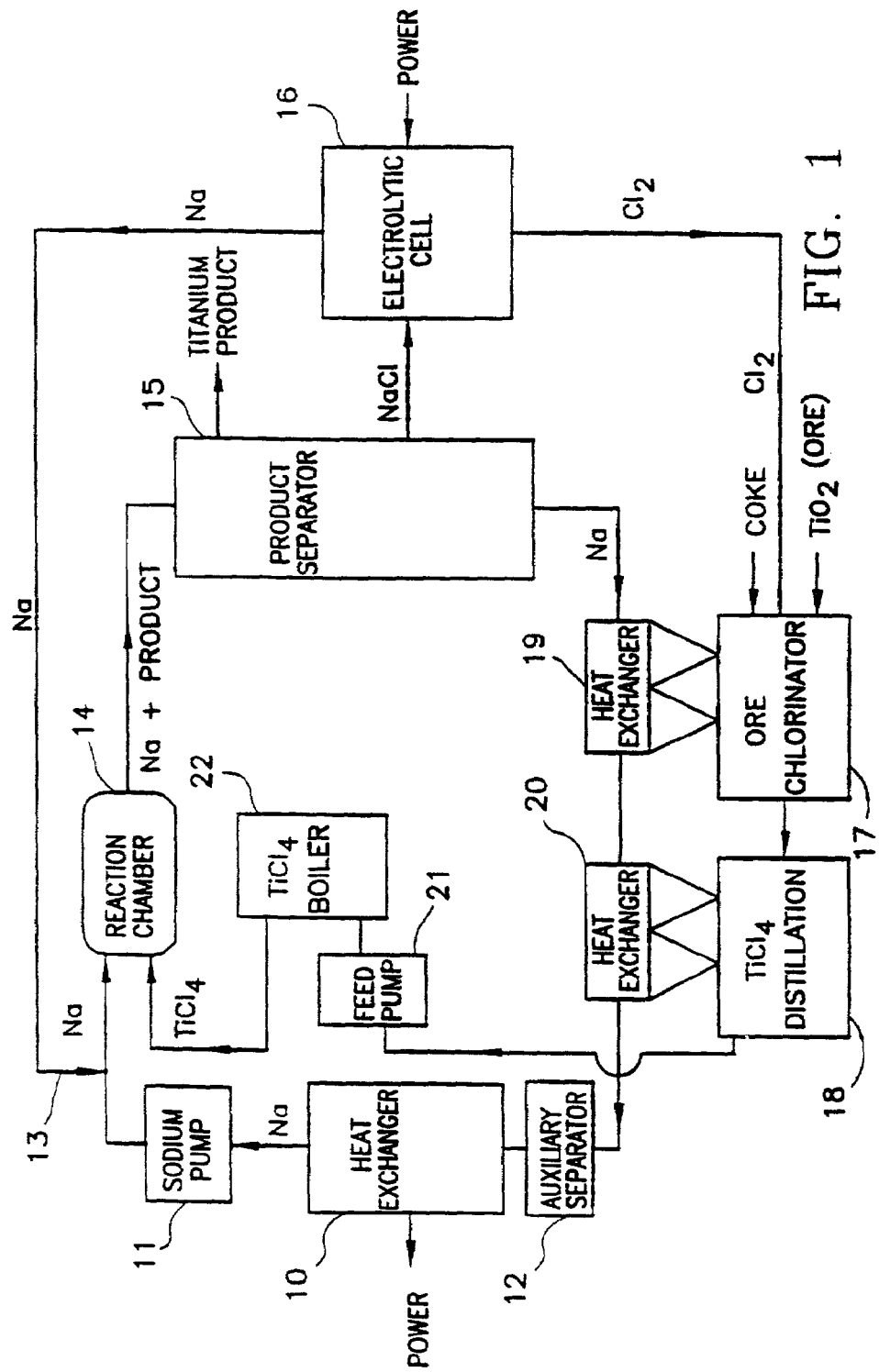
FIG. 1 is a process flow diagram showing the continuous process for producing as an example titanium metal from titanium tetrachloride.

A summary process flowsheet is shown in FIG. 1. Sodium and titanium tetrachloride are combined in a reaction chamber 14 where titanium tetrachloride vapor from a source thereof in the form of a boiler 22 is injected within a flowing sodium stream from a continuously cycling loop thereof including a sodium pump 11. The sodium stream is replenished by sodium provided by an electrolytic cell 16. The reduction reaction is highly exothermic, forming molten reaction products of titanium and sodium chloride. The molten reaction products are quenched in the bulk sodium stream. Particle sizes and reaction rates are controlled by metering of the titanium tetrachloride vapor flowrate (by controlling the supply pressure), dilution of the titanium tetrachloride vapor with an inert gas, such as He or Ar, and the sodium flow characteristics and mixing parameters in the reaction chamber which includes a nozzle for the titanium tetrachloride and a surrounding conduit for the liquid sodium. The vapor is intimately mixed with the liquid in a zone enclosed by the liquid, i.e., a liquid continuum, and the resultant temperature, significantly affected by the heat of reaction, is controlled by the quantity of flowing sodium and maintained below the sintering temperature of the produced metal, such as for titanium at about 1000° C. Preferably, the temperature of the sodium away from the location of halide introduction is maintained in the range of from about 200° C. to about 600° C. Products leaving the reaction zone are quenched in the surrounding liquid before contact with the walls of the reaction chamber and preferably before contact with other product particles. This precludes sintering and wall erosion.

The surrounding sodium stream then carries the titanium and sodium chloride reaction products away from the reaction region. These reaction products are removed from the bulk sodium stream by conventional separators 15 such as cyclones, particulate filters, magnetic separators or vacuum stills.

Three separate options for separation of the titanium and the sodium chloride exist. The first option removes the titanium and sodium chloride products in separate steps. This is accomplished by maintaining the bulk stream temperature such that the titanium is solid but the sodium chloride is molten through control of the ratio of titanium tetrachloride and sodium flowrates to the reaction chamber 14. For this option, the titanium is removed first, the bulk stream cooled to solidify the sodium chloride, then the sodium chloride is removed from separator 12.

In the second option for reaction product removal, a lower ratio of titanium tetrachloride to sodium flowrate would be maintained in the reaction chamber 14 so that the bulk sodium temperature would remain below the sodium chloride solidification temperature. For this option, titanium and sodium chloride would be removed simultaneously using conventional separators. The sodium chloride and any residual sodium present on the particles would then be removed in a water-alcohol wash.

In the third, and preferred option for product removal, the solid cake of salt, Ti and Na is vacuum distilled to remove the Na. Thereafter, the Ti particles are passivated by passing a gas containing some $O_2$ over the mixture of salt and Ti followed by a water wash to remove the salt leaving Ti particles with surfaces of $TiO_2$, which can be removed by conventional methods.

Following separation, the sodium chloride is then recycled to the electrolytic cell 16 to be regenerated. The sodium is returned to the bulk process stream for introduction to reaction chamber 14 and the chlorine is used in the ore chlorinator 17. It is important to note that while both electrolysis of sodium chloride and subsequent ore chlorination will be performed using technology well known in the art, such integration and recycle of the reaction by-product directly into the process is not possible with the Kroll or Hunter process because of the batch nature of those processes and the production of titanium sponge as an intermediate product. In addition, excess process heat is removed in heat exchanger 10 for co-generation of power. The integration of these separate processes enabled by the inventive chemical manufacturing process has significant benefits with respect to both improved economy of operation and substantially reduced environmental impact achieved by recycle of both energy and chemical waste streams.

Chlorine from the electrolytic cell 16 is used to chlorinate titanium ore (rutile, anatase or ilmenite) in the chlorinator 17. In the chlorination stage, the titanium ore is blended with coke and chemically converted in the presence of chlorine in a fluidized-bed or other suitable kiln chlorinator. The titanium dioxide contained in the raw material reacts to form titanium tetrachloride, while the oxygen forms carbon dioxide with the coke. Iron and other impurity metals present in the ore are also converted during chlorination to their corresponding chlorides. The titanium chloride is then condensed and purified by means of distillation in column 18. With current practice, the purified titanium chloride vapor would be condensed again and sold to titanium manufacturers; however, in this integrated process, the titanium tetrachloride vapor stream is used directly in the manufacturing process via a feed pump 21 and boiler 22.

After providing process heat for the distillation step in heat exchangers 19 and 20, the temperature of the bulk process stream is adjusted to the desired temperature for the reaction chamber 14 at heat exchanger 10, and then combined with the regenerated sodium recycle stream, and injected into the reaction chamber. The recovered heat from heat exchangers 19 and 20 may be used to vaporize liquid halide from the source thereof to produce halide vapor to react with the metal or the non-metal. It should be understood that various pumps, filters, traps, monitors and the like will be added as needed by those skilled in the art.

Figure 2:
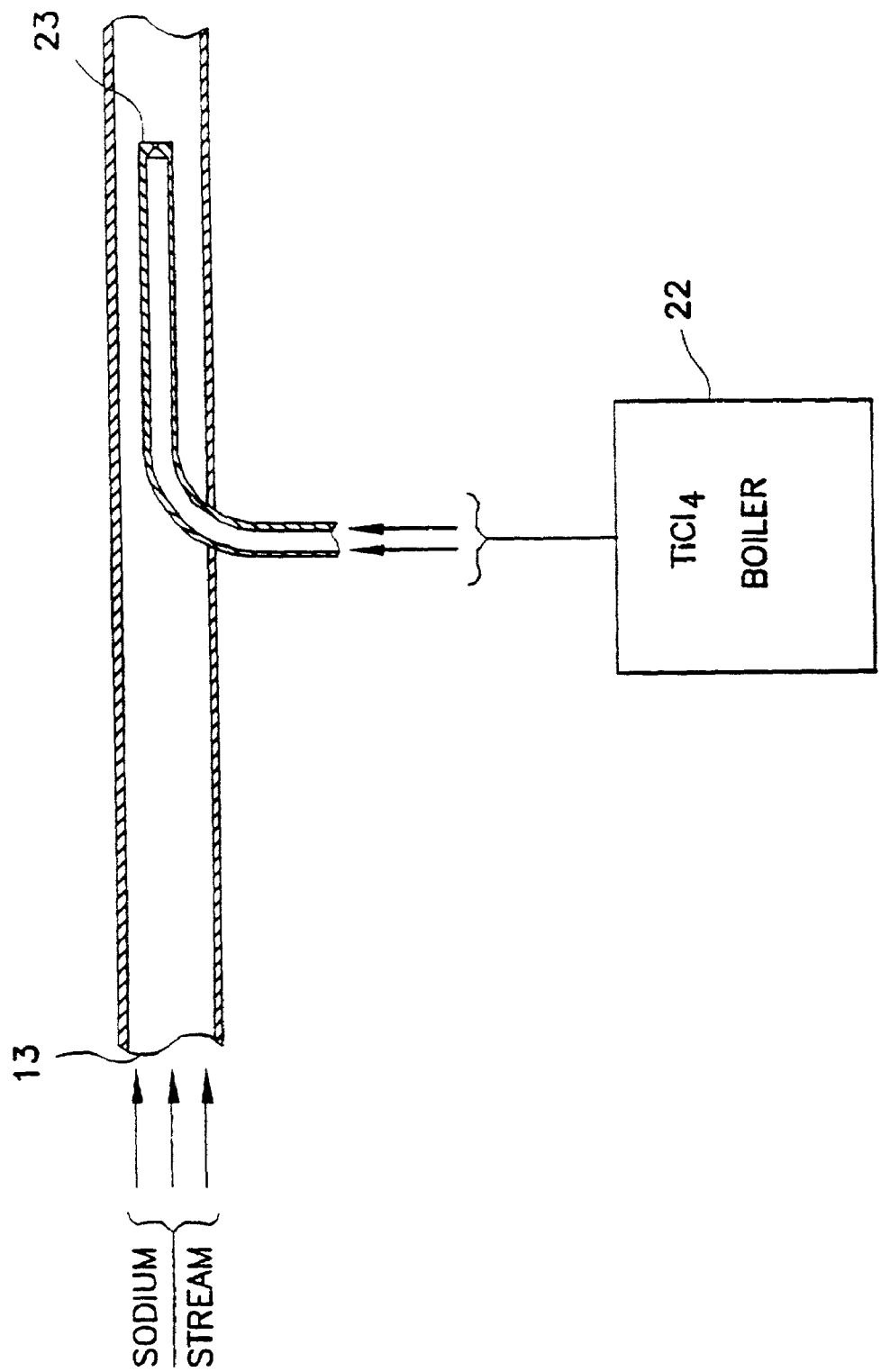
FIG. 2 is an example of a burner reaction chamber for a continuous process.

In all aspects, for the process of FIG. 1, it is important that the titanium that is removed from the separator 15 be at or below the sintering temperature of titanium in order to preclude and prevent the solidification of the titanium on the surfaces of the equipment and the agglomeration of titanium particles into large masses, which is one of the fundamental difficulties with the commercial processes used presently. By maintaining the temperature of the titanium metal below the sintering temperature of titanium metal, the titanium will not attach to the walls of the equipment or itself as it occurs with prior art and, therefore, the physical removal of the same will be obviated. This is an important aspect of this invention and is obtained by the use of sufficient sodium metal or diluent gas or both to control the temperature of the elemental (or alloy) product. In other aspects, FIG. 1, is illustrative of the types of design parameters which may be used to produce titanium metal in a continuous process which avoids the problems with the prior art. Referring now to FIG. 2, there is disclosed a typical reaction chamber in which a choke flow or injection nozzle 23, completely submerged in a flowing liquid metal stream, introduces the halide vapor from a boiler 22 in a controlled manner into the liquid metal reductant stream 13. The reaction process is controlled through the use of a choke-flow (sonic or critical flow) nozzle. A choke-flow nozzle is a vapor injection nozzle that achieves sonic velocity of the vapor at the nozzle throat. That is the velocity of the vapor is equal to the speed of sound in the vapor medium at the prevailing temperature and pressure of the vapor at the nozzle throat. When sonic conditions are achieved, any change in downstream conditions that causes a pressure change cannot propagate upstream to affect the discharge. The downstream pressure may then be reduced indefinitely without increasing or decreasing the discharge. Under choke flow conditions only the upstream conditions need to be controlled to control the flow-rate. The minimum upstream pressure required for choke flow is proportioned to the downstream pressure and termed the critical pressure ratio. This ratio may be calculated by standard methods.

The choke flow nozzle serves two purposes: (1) it isolates the vapor generator from the liquid metal system, precluding the possibility of liquid metal backing up in the halide feed system and causing potentially dangerous contact with the liquid halide feedstock, and (2) it delivers the vapor at a fixed rate, independent of temperature and pressure fluctuations in the reaction zone, allowing easy and absolute control of the reaction kinetics.

The liquid metal stream also has multiple functional uses: (1) it rapidly chills the reaction products, forming product powder without sintering, (2) it transports the chilled reaction products to a separator, (3) it serves as a heat transfer medium allowing useful recovery of the considerable reaction heat, and (4) it feeds one of the reactants to the reaction zone.

For instance in FIG. 2, the sodium 13 entering the reaction chamber is at 200° C. having a flow rate of 38.4 kilograms per minute. The titanium tetrachloride from the boiler 22 is at 2 atmospheres and at a temperature of 164° C., the flow rate through the line was 1.1 kg/min. Higher pressures may be used, but it is important that back flow be prevented, so the minimum pressure should be above that determined by the critical pressure ratio for sonic conditions, or about two times the absolute pressure of the sodium stream (two atmospheres if the sodium is at atmospheric pressure) is preferred to ensure that flow through the reaction chamber nozzle is critical or choked.

Figure 3:
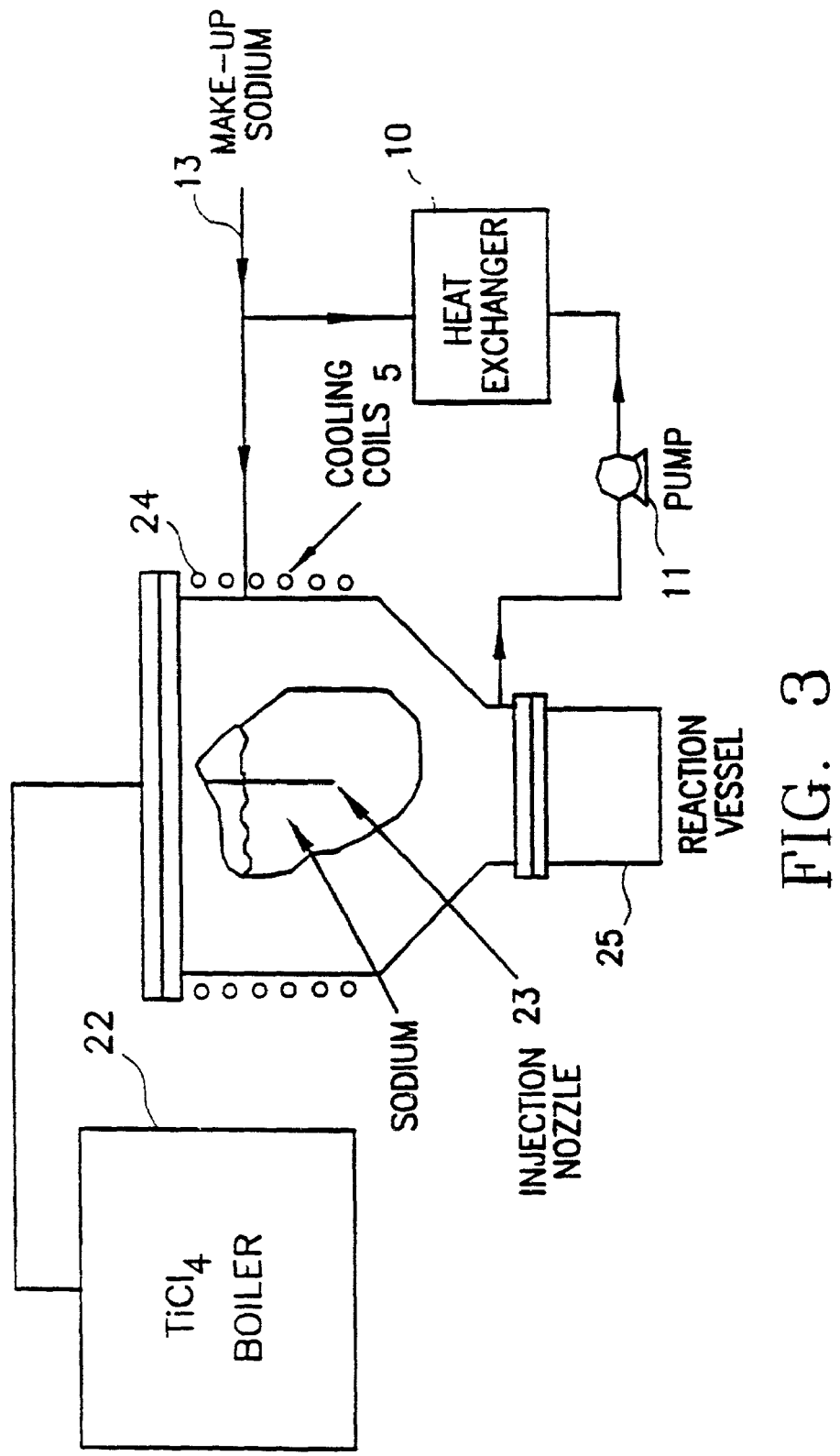
FIG. 3 is a process diagram of a batch process reaction.

The batch process illustrated in FIG. 3 shows a subsurface introduction of titanium tetrachloride vapor through an injection or an injector or a choke flow nozzle 23 submerged in liquid sodium contained in a reaction vessel 24. The halide vapor from the boiler 22 is injected in a controlled manner where it reacts producing titanium powder and sodium chloride. The reaction products fall to the bottom of the tank 25 where they are collected for removal. The tank walls are cooled via cooling colis 24 and a portion of the sodium in the tank is pumped out via pump 11 and recycled through a heat exchanger 10 and line 5 back to the tank to control the temperature of the sodium in the reaction vessel. Process temperatures and pressures are similar to the continuous flow case with bulk sodium temperature of 200° C., titanium tetrachloride vapor of 164° C., and the feed pressure of the titanium tetrachloride vapor about twice the pressure in the reaction vessel.

In the flow diagrams of FIGS. 1 and 3, sodium make-up is indicated by the fine 13 and this may come from an electrolytic cell 16 or some other entirely different source of sodium. In other aspects, FIG. 3 is illustrative of the types of design parameters which may be used to produce titanium metal in a batch process which avoids agglomeration problems inherent in the batch process presently in use commercially.

BRIEF DESCRIPTION OF THE PRODUCTION OF TITANIUM

Figure 4:
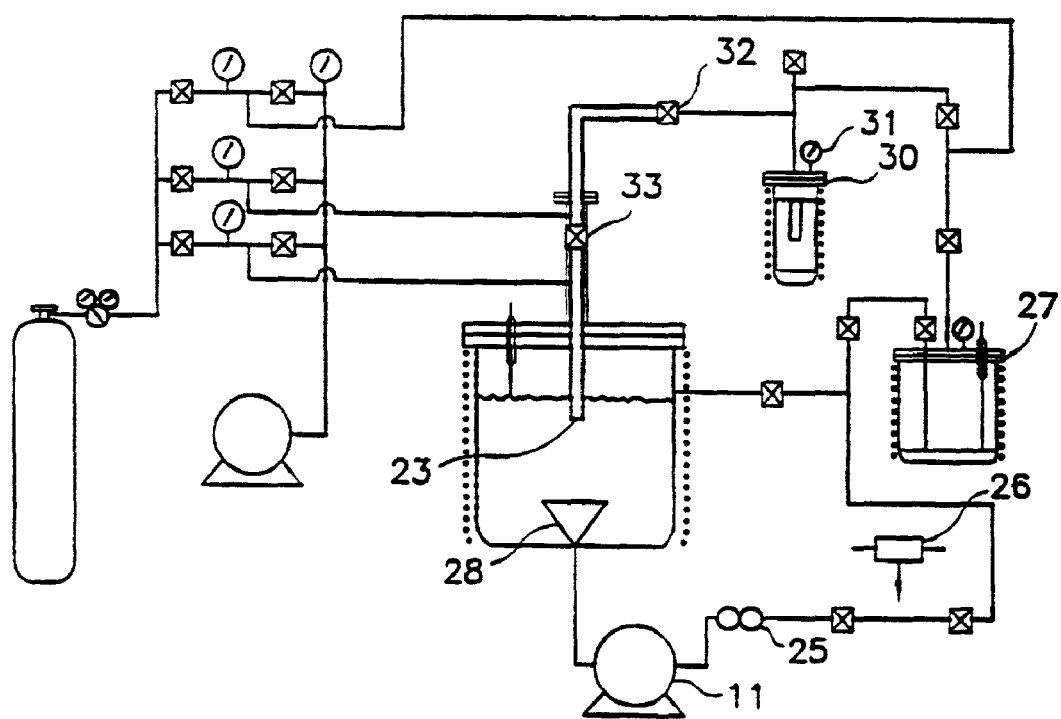
FIG. 4 is a diagram of the apparatus used to produce titanium.

FIG. 4 shows a schematic depiction of a loop used to produce titanium metal powder. The parts of the loop of most importance to the operation are a large (10 liter) reaction vessel 29 with a collection funnel 28 at the bottom feeding into a recycle stream. The recycle stream has a low volume, low head, electromagnetic pump 11 and a flow meter 25.

A titanium tetrachloride injection system consisted of a heated transfer line, leading from a heated tank 30 with a large heat capacity, to a submerged choke flow nozzle 23. The system could be removed completely from the sodium loop for filling and cleaning. It should be understood that some commercial grades of Na have Ca or other alkaline earth metals therein. This has no substantial affect on the invention.

Operation

A typical operating procedure follows:
1. Raise temperature of sodium loop to desired point (200° C.).
2. Open titanium tetrachloride tank and fill with titanium tetrachloride.
3. Insert the nozzle into the airlock above the ball valve 33.
4. Heat titanium tetrachloride tank to desired temperature (168° C.) as determined by vapor pressure curve (2 atm.) and the required critical flow pressure.
5. Start an argon purge through the nozzle.
6. Open ball valve 33 and lower the nozzle into sodium.
8. Stop the purge and open valve 32 allowing titanium tetrachloride to flow through the nozzle into the sodium.
9. When titanium tetrachloride pressure drops close to the critical pressure ratio, close the valve 32 and withdraw the nozzle above valve 33.
10. Close valve 33 and let the nozzle cool to room temperature.
11. Remove the titanium tetrachloride delivery system and clean.

The injection of titanium tetrachloride was monitored by measuring the pressure in the titanium tetrachloride system. A pressure transducer 31 was installed and a continuous measurement of pressure was recorded on a strip chart.

A filtration scheme was used to remove products from the bulk sodium at the end of the test. The recycle stream system was removed from the sodium loop. In its place, a filter 26 consisting of two 5 cm diameter screens with 100 μm holes in a housing 20 cm long, was plumbed into a direct line connecting the outlet of the reaction vessel to the sodium receiver tank. All of the sodium was transferred to the transfer tank 27.

The reaction product was washed with ethyl alcohol to remove residual sodium and then passivated with an oxygen containing gas and washed with water to remove the sodium chloride by-product. Particle size of the substantially pure titanium ranged between about 0.1 and about 10 μm with a mean size of about 5.5 μm. The titanium powder produced in the apparatus was readily separable from the sodium and sodium chloride by-product.

The invention has been illustrated by reference to titanium alone and titanium tetrachloride as a feedstock, in combination with sodium as the reducing metal. However, it should be understood that the foregoing was for illustrative purposes only and the invention clearly pertains to those metals and non-metals in Table 1, which of course include the fluorides of uranium and rhenium and well as other halides such as bromides. Moreover, sodium while being the preferred reducing metal because of cost and availability, is clearly not the only available reductant. Lithium, potassium as well as magnesium, calcium and other alkaline earth metals are available and thermodynamically feasible. Moreover, combinations of alkali metals and alkaline earth metals have been used, such as Na and Ca. The two most common reducing agents for the production of Ti are Na and Mg, so mixtures of these two metals may be used, along with Ca, which is present in some Na as a by product of the method of producing Na. It is well within the skill of the art to determine from the thermodynamic Tables which metals are capable of acting as a reducing agent in the foregoing reactions, the principal applications of the process being to those illustrated in Table 1 when the chloride or halide is reduced to the metal. Moreover, it is well within the skill of the art and it is contemplated in this invention that alloys can be made by the process of the subject invention by providing a suitable halide feed in the molecular ratio of the desired alloy.

While there has been disclosed what is considered to be the preferred embodiment of the present invention, it is understood that various changes in the details may be made without departing from the spirit, or sacrificing any of the advantages of the present invention.

In the process described in the '761 patent, FIG. 2 and the description thereof as well as in the '106 patent, FIG. 2 and the description thereof as well as in FIG. 2 and the description thereof in the parent application Ser. No. 09/264,877, there is inherently produced Ti powder and Ti alloy powder having unique morphological properties as illustrated in FIGS. 5 to 8. More particularly, the Ti inherently produced has an iron concentration of less than 200 ppm as measured by ICPQ; a nitrogen concentration of less than 200 ppm as measured by a LECO gas analyzer, and a hydrogen concentration of less than about 100 ppm as measured by a LECO gas analyzer. The Ti powder inherently produced by the process mentioned in this paragraph intimately mixed with NaCl, when formed, but when thoroughly washed to remove the NaCl, the remaining Ti powder has a chlorine concentration of less than 100 ppm as measured by neutron activation analysis.

Moreover, the Ti powder inherently produced after washing and separation has a packing fraction of between about 4% to about 11% as determined by a tap density measurements in which the Ti powder is introduced into a graduated test tube and tapped until the powder is fully settled. Thereafter, the weight of the powder is measured and the packing fraction or percent of theoretical density is calculated.

Figure 5:
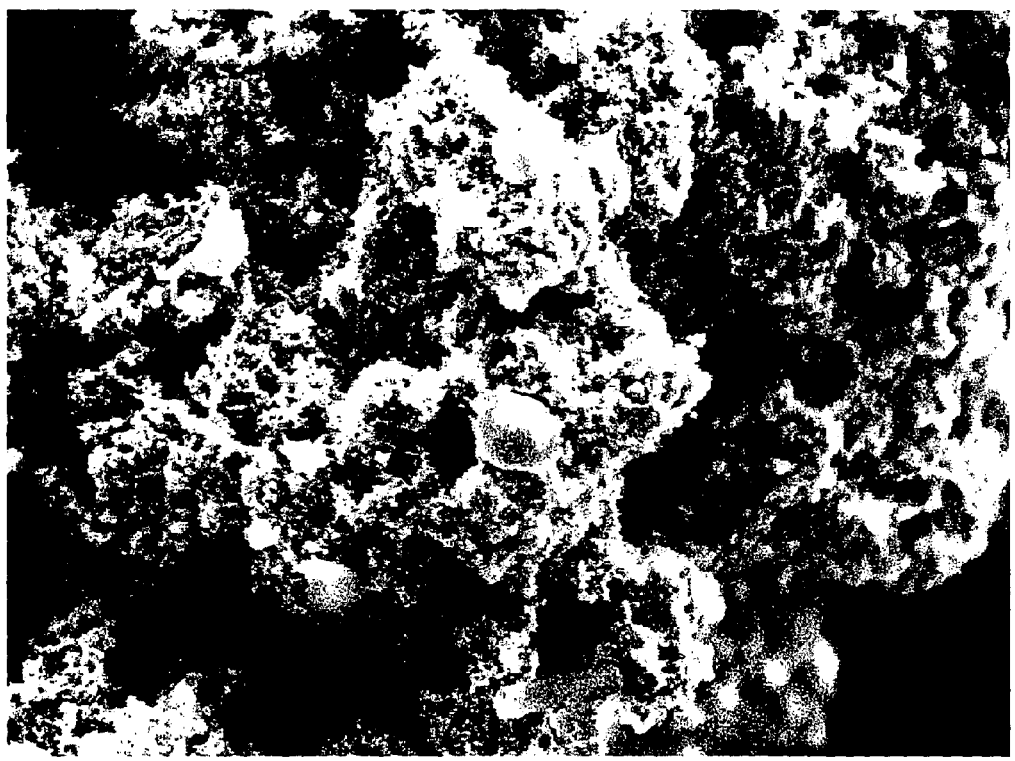
FIG. 5 is a SEM of Ti powder made by the process of the '761 and '106 patents.
Figure 6:
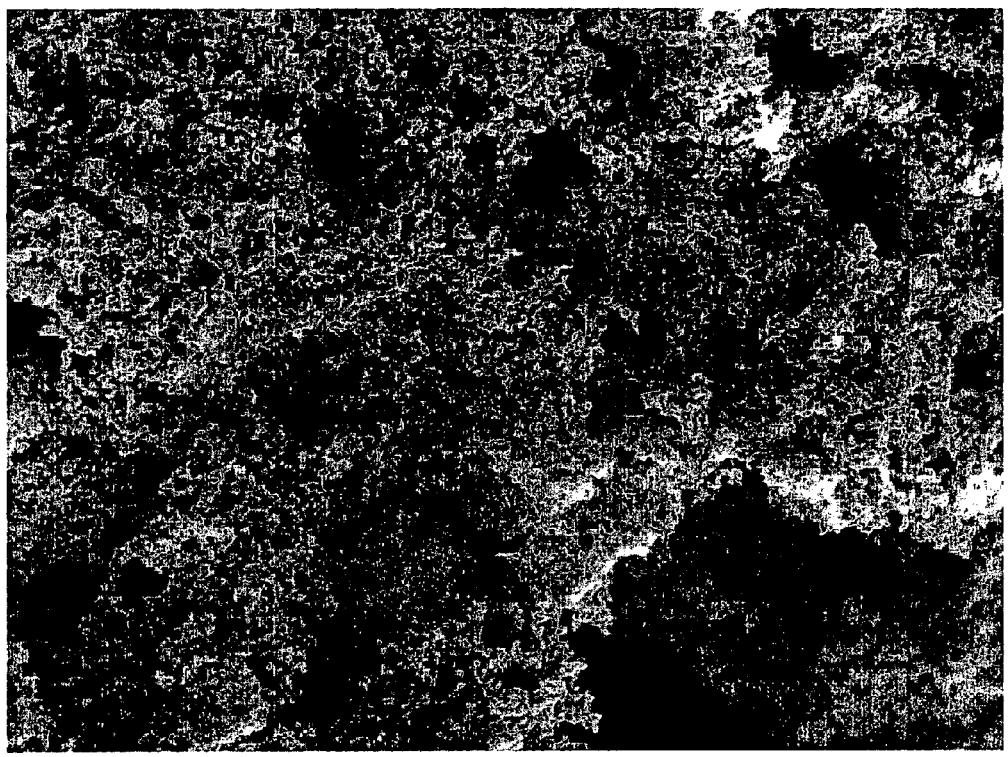
FIG. 6 is a SEM of Ti powder made in accordance with the process set forth in the '761 and '106 patents.

In addition, the Ti powder inherently produced has a BET surface area ranging from 0.4 $m^2$/gm for a sample of the largest particles to about 6.4 $m^2$/gm for a sample of the smallest particles or fines. With fines separated from the material, the BET surface area for samples is in the range of about 0.4 to about 1.0 $m^2$/gm. Calculation of the particle diameters based on the BET surface area and assuming spherical shape results in particle diameters in the range of from about 3.3 to about 1.3 microns when the fines have been removed. By separation of fines, we mean that a sample of particles produced by the inventive method which do not readily settle in minutes are classified as fines. During the production of the Ti powder by the inventive method both agglomerated particles and unagglomerated particles are inherently produced. For instance, when the Na temperature after the reaction downstream of the tip of nozzle 23 is near 350° C., the agglomerates are small on average about 0.2 mm in any one direction, whereas when the Na temperature after the reaction downstream of the top of nozzle 23 is higher, for instance about 450° C., the agglomerates are larger, on average of about 1.6 mm in any one direction Prior art Ti powder has been made by one of two processes, either a hydride/dehydride process which produced flake shaped powder or a process in which Ti is melted followed by atomization which results in spherical shaped powders. Low quality (high impurity) fines are produced in the Hunter process. The Ti and Ti alloy powder inherently made by the process disclosed herein is neither flake-shaped nor spherical shaped, as defined in Powder Metallurgy Science, by Randall M. German, second edition, © Metal Powder Industries Federation 1984, 1994 page 63, a standard reference book. Morphology as used herein includes powder shape and size. The morphology of the powder illustrated in FIG. 5 is unlike any Ti powder known to the applicants, including Hunter fines. With reference to FIG. 5, the large shiny globes and crystals are NaCl, not the titanium produced according to the method of the '761 and '106 patents. FIG. 6 is another SEM of Ti powder made in accordance with the process set forth in the '761 and '106 patents, also at 3000 magnification as is FIG. 5.

Figure 7:
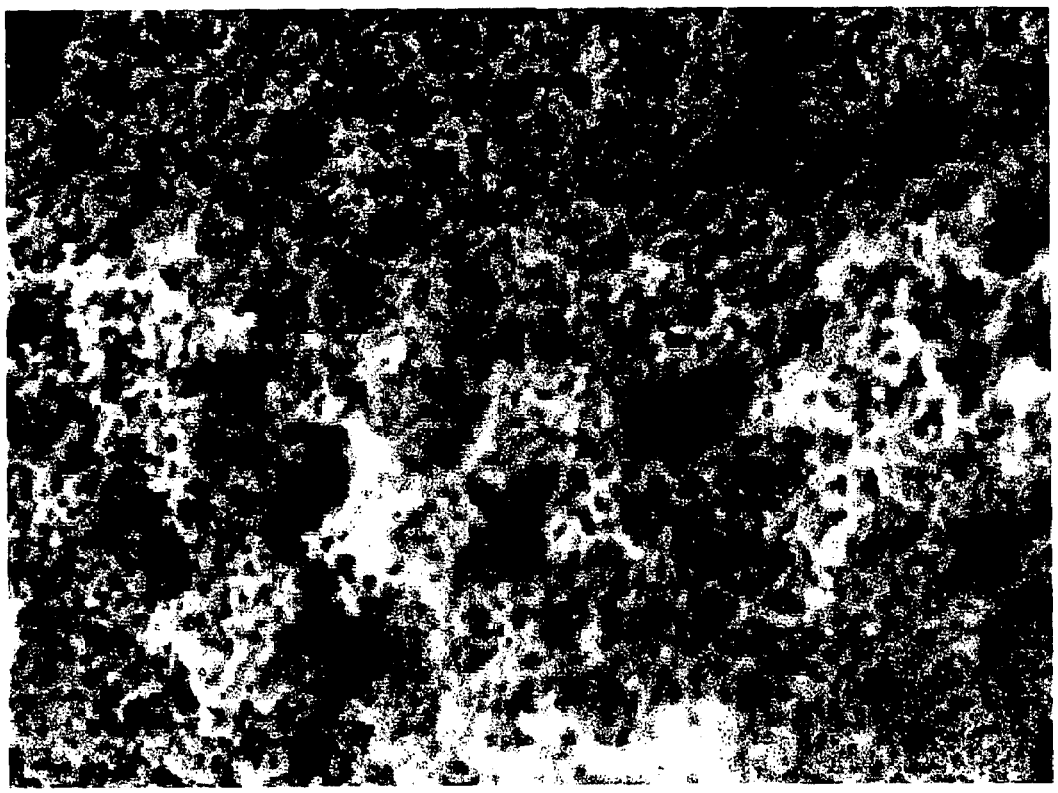
FIG. 7 is a SEM of a Ti alloy made in accordance with the process set forth in the '761 and '106 patents.
Figure 8:
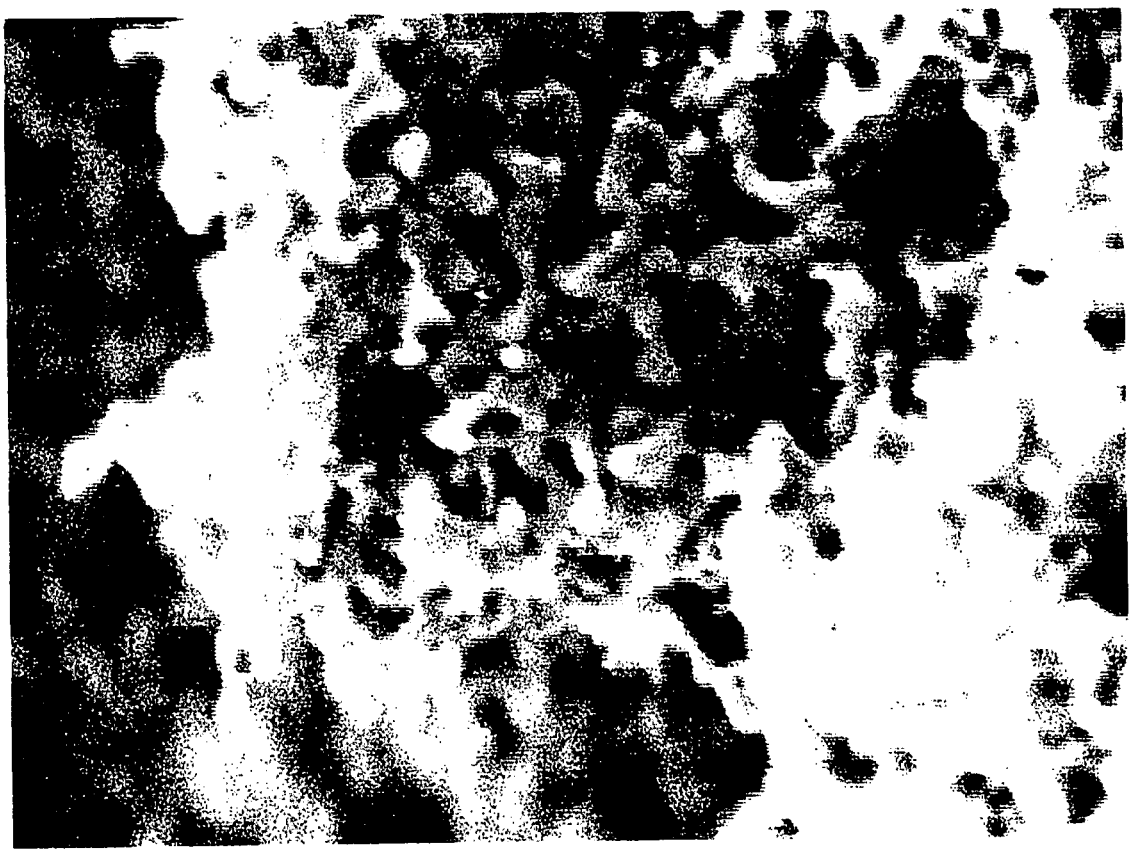
FIG. 8 is a SEM of a Ti alloy made in accordance with the process set forth in the '761 and '106 patents.

FIGS. 7 and 8 are SEMs of Ti alloy made in accordance with the process of the '761 and '106 patents; however, these SEMs are at 5000 and at 10,000 magnification, respectively. These SEMs (5-8) are different morohologically with respect to the powders made and distilled as taught in U.S. Pat. No. 6,409,797 using distillation to separate excess Na from the reaction products and morphologically different from other Ti powders known to applicants.

It has been well known in the powder metallurgy art prior to Aug. 1,1994, how to convert metal powder to solid shapes by a variety of processes, such as powder metallurgy, powder metallurgy using press and sinter methods, powder injection molding, metal injection molding, powder to plate, continuous casting techniques by way of example, only. These methods, well known prior to Aug. 1,1994, have been used to convert titanium powder to solid products as well as to convert a wide variety of other metals and metal alloy powders to solid products.

We claim:

1. A Ti or alloy thereof produced by the method of submerging a halide vapor of the Ti or mixtures of halide vapors into a liquid alkali metal or alkaline earth metal or mixtures thereof present in sufficient excess of stoichiometric to maintain substantially all the Ti or alloy thereof below the sintering temperature thereof.

2. The Ti or alloy thereof of claim 1, wherein the Ti or alloy is a powder.

3. The Ti or alloy thereof of claim 2, wherein the Ti or Ti alloy powder is converted to a solid product.

4. The Ti or alloy thereof of claim 1, wherein the alkali metal is Na.

5. The Ti or alloy thereof of claim 1, wherein the Ti or alloy thereof is produced continuously.

6. The Ti or alloy of claim 1, wherein the reaction between the halide and the flowing liquid is exothermic.

7. The Ti or alloy thereof of claim 1, wherein the halide is $TiCl_4$ and the alkali metal is Na and the temperature of the liquid Na away from where the halide vapor is introduced into the flowing Na to produce Ti powder is maintained below the sintering temperature of Ti.

8. The titanium powder of claim 7, wherein the liquid Na is present in sufficient excess to quench Ti powder upon production thereof to reduce the temperature of the Ti powder below the sintering temperature of Ti.

9. The titanium powder of claim 7, wherein the Ti powder is converted to a solid product.

10. The Ti or alloy of claim 1, wherein the halide vapor includes $TiCl_4$ submerged in Na or Mg to produce a powder of Ti or a Ti alloy which is converted to a solid product.

11. A titanium powder produced by the method of introducing a titanium halide vapor at least at sonic velocity in a flowing liquid alkali metal or liquid alkaline earth metal or mixtures thereof.

12. The titanium powder of claim 11, wherein the titanium vapor is $TiCl_4$ and the flowing liquid is Na.

13. A solid Ti product made from the powder of claim 11.

14. A titanium alloy powder produced by the method of introducing a titanium halide vapor at least at sonic velocity and one or more other halide vapors in a flowing liquid alkali metal or liquid alkaline earth metal or mixtures thereof.

15. The titanium alloy powder of claim 14, wherein the titanium halide is $TiCl_4$ and the flowing liquid metal is Na.

16. A solid Ti alloy product made from the powder of claim 14.

17. A titanium powder produced by introducing a $TiCl_4$ vapor into a flowing stream of alkali metal at a velocity not less than sonic velocity of the vapor submerged in liquid Na.

18. A solid titanium product made from the powder of claim 17.

19. The titanium powder of claim 17, wherein the titanium powder is maintained below the sintering temperature thereof during production by providing excess Na to quench the titanium powder as it is produced.

20. The Ti powder of claim 17, wherein the liquid Na is maintained at a temperature in the range of from about 200° C. to about 400° C. except where the $TiCl_4$ reacts with the liquid Na during the production of the Ti powder.

21. The Ti powder of claim 17, wherein the liquid Na is maintained at a temperature less than about 850° C. except where the $TiCl_4$ reacts with the liquid Na during the production of the Ti powder.

22. A titanium or titanium alloy powder produced by the continuous chemical reduction of titanium tetrachloride alone or in combination with other metal halides by subsurface reaction of the halide in flowing alkali or alkaline earth metal or mixtures thereof.

23. The Ti or Ti alloy powder of claim 22, wherein the powder is converted to a solid product.

24. A titanium alloy powder substantially as illustrated in FIGS. 7 or 8.

25. A solid product made from the titanium alloy powder of claim 24.

26. The titanium alloy powder of claim 24, wherein the powder is made by the subsurface reduction of the halides of titanium and the other alloy constituents by an alkali or alkaline earth metal or mixtures thereof.

27. A titanium powder substantially as illustrated in FIGS. 5 or 6.

28. A solid product made from the titanium powder of claim 27.

29. The Ti powder of claim 27, produced by introducing a $TiCl_4$ vapor into a flowing stream of alkali metal at a velocity not less than sonic velocity of the vapor submerged in liquid Na.

30. A Ti produced by the method of submerging a halide vapor of the Ti [or mixtures of halide vapors] into a liquid alkali metal or alkaline earth metal or mixtures thereof present in sufficient excess of stoichiometric to maintain substantially all the Ti below the sintering temperature thereof.

31. The Ti of claim 30, wherein the Ti is a powder.

32. The Ti of claim 30, wherein the powder produced by the method is converted to a solid product.

33. The Ti of claim 30, wherein the Ti is produced continuously or in batches.

34. The Ti of claim 30, wherein the halide is $TiCl_4$ and the alkali metal is Na present in excess of the stoichiometric quantity needed to react with TiCl$_4$ such that essentially all of the Ti powder is maintained below the sintering temperature of Ti.

35. A titanium or titanium alloy powder produced by the method submerging a titanium halide vapor or mixture of halide vapors in flowing liquid alkali metal or liquid alkaline earth metal or mixtures thereof present in sufficient quantities to maintain substantially all the titanium or titanium alloy below the sintering temperatures thereof.

36. A solid Ti or Ti alloy product made from the powder of claim 35.

37. A titanium or titanium alloy powder produced by the continuous chemical reduction of titanium tetrachloride alone or in combination with other metal halides by injection of the halide or halides at least at sonic velocity into a liquid continuum of alkali or alkaline earth metal or mixtures thereof.

38. The Ti or Ti alloy powder of claim 37, wherein the alkali metal is Na or Mg or mixtures containing either Na or Mg and the temperature of the liquid reducing agent away from where the halide vapor is introduced is maintained in the range of from about 200° C. to about 600° C.

39. The Ti or Ti alloy powder of claim 38, wherein the powder is converted to a solid product.

40. A titanium powder produced by the continuous chemical reduction of titanium tetrachloride by subsurface reaction of the halide in flowing alkali or alkaline earth metal or mixtures thereof.

41. A titanium powder produced by submerging a titanium halide vapor in flowing liquid alkali metal or liquid alkaline earth metal or mixtures thereof present in sufficient quantities to maintain substantially all the titanium powder below the sintering temperatures thereof.

42. A titanium powder produced by the continuous chemical reduction of titanium tetrachloride by injection of the halide at least at sonic velocity into a liquid continuum of alkali or alkaline earth metal or mixtures thereof.

43. A titanium or titanium alloy powder produced by the method injecting a titanium halide vapor or mixture of halide vapors at least at sonic velocity into flowing liquid alkali metal or liquid alkaline earth metal or mixtures thereof present in sufficient quantities to maintain substantially all the titanium or titanium alloy below the sintering temperatures thereof.

44. A titanium powder produced by the method of injecting a titanium halide vapor at least at sonic velocity into flowing liquid alkali metal or liquid alkaline earth metal or mixtures thereof present in sufficient quantities to maintain substantially all the titanium powder below the sintering temperature thereof.

* * * * *